April 12, 1932.    R. McANDREW    1,854,051

WATERWORKS TAP

Filed Nov. 4, 1929

Inventor:
Robert McAndrew,
By Mawhinney & Mawhinney,
Attys.

Patented Apr. 12, 1932

1,854,051

UNITED STATES PATENT OFFICE

ROBERT McANDREW, OF COVENTRY, ENGLAND

WATERWORKS TAP

Application filed November 4, 1929, Serial No. 404,834, and in Great Britain November 7, 1928.

This invention relates to water works taps of the kind comprising a ferrule which can be inserted by the aid of a machine to a water main or the like when it is full and under pressure. The object of the invention is to provide an effective, simple and inexpensive tap which can be fitted with existing machines and holders and which has the additional advantage that it can subsequently be used as a stop tap, control or retaining valve, without leakage.

According to this invention, the tap comprises the combination with an axially straight ferrule portion containing a screw sealing plug cooperating therewith, adapted for fitting to a main which is under pressure, in the known manner, of an adjustable body incorporating the means for connecting the branch pipe, means for securing the body to the ferrule after it is in position, a cap fitting on the ferrule, and a key for moving the sealing plug which key is carried by the cap in such a manner that leakage is prevented.

Figure 1:
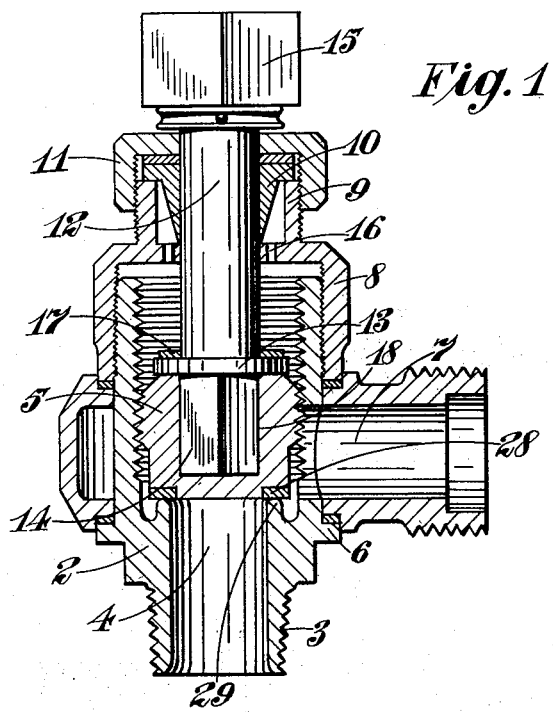
Figure 2:
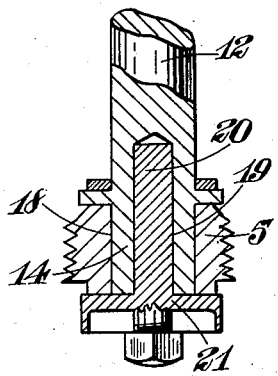

In the accompanying drawings,

Figure 1 is a central vertical section of one form of tap of the kind referred to constructed in accordance with this invention, and Figure 2 is a partial section of a modification.

The ferrule 2 is provided with the usual screw-threaded neck 3 which is adapted to be screwed into a water main or the like by the known type of machine which can drill the hole in the main, tap it and screw the ferrule into place. The mouth 4 of the ferrule is kept sealed during insertion by the sealing plug 5 which screws into the ferrule as shown.

The ferrule has a suitably shaped opening which communicates with the annular space of the adjustable body 7 and is formed outside with a flange or shoulder 6 upon which rests the under side of the body. Screwing on the outside of the inner end of the ferrule is a cap 8 which clamps the adjustable body between it and the flange 6.

At the top of this cap is an extension 9 in which is arranged packing of some kind. This may either be a non-metallic flexible conical packing 10, an inverted U-section hydraulic packing, or merely stuffing. In either case this is secured by a gland nut 11.

The packing tends to hold in place a key 12 which is formed towards the bottom with a flange 13 and it has a square or other non-circular end 14 which forms a non-rotative connection with a similarly shaped recess or hole 18 in the sealing plug 5.

The top of the key is formed or fitted at 15 with a triangular head, handle or means to receive an actuating device of any kind.

Before inserting the ferrule in a main full of water under pressure, the cap 8 is unscrewed and the body 7 removed. The ferrule is then inserted with the plug 5 in closed position, and this can be done with the existing type of holder such as is used in machines employed for inserting this kind of ferrule. Subsequently the adjustable body and cap 8 can be fitted, the key 12 being inserted in position as this is done.

The device can then serve as a stop tap for the branch pipe attached to the body 7 as the sealing plug can be screwed up and down by means of the key, or be left in any desired position, but there will be no leakage owing to the employment of the packing engaging the key. This packing may be subjected to the internal pressure by providing vents 16, so that leakage is almost impossible. Furthermore, the flange 13 may carry a sealing ring 17 adapted to bear against the face containing the vents 16 when the key and sealing plug are fully unscrewed. Leakage past the key is then absolutely prevented.

The sealing plug is shown as having a sealing ring 28 engaging a raised seating 29 suitable for acting as a stop tap. Alternatively it may carry a loose retaining valve of the known type as is shown in Figure 2. When such a valve is used the shaped recess 18 is continued through the plug 5 and a central hole 19 is made in the shaped portion 14 of the key to take the stem 20 of such valve 21.

The device is inexpensive as it comprises a small number of parts, it can be fitted without the employment of special carriers, and it serves the purpose of a stop tap, control or retaining valve as well as merely a means for attaching a branch to a main under pressure.

When used as a control valve, the height of the sealing plug 5 from its seating is regulated to control the amount of water supplied to the branch pipe. When fitted with a loose retaining valve as shown in Figure 2, the tap will permit flow of water from the main to the branch pipe but will retain the water in the latter, preventing its return to the main.

It is not essential that the cap 8 should engage the swivelling body as the latter may be secured by other means, such as a nut screwing on the ferrule and located between the under side of the cap and the swivelling body.

What I claim as my invention and desire to secure by Letters Patent of the United States is:—

1. A water-tap for application to water-mains while under pressure, comprising a ferrule of straight axial construction having an externally threaded outer end for engagement in the main and provided with an external inwardly facing shoulder beyond the inner end of the threaded portion, said ferrule having a lateral opening therethrough inwardly of the shoulder and provided beyond the shoulder with a smooth bearing portion, said ferrule having an inwardly raised valve seat therein and provided with internal threads extending from said seat through the inner end of the ferrule, said ferrule also having exterior threads on its inner end portion, a sealing plug mounted in the ferrule in engagement with the interior threads thereof and being of less length than said threaded portion and adapted to be turned down against said seat for closing the ferrule during application of the same to the water-main, said plug having a non-circular opening through its inner end, a body portion removably fitting over the ferrule about the smooth portion thereof and abutting against said shoulder and having a lateral branch communicating with the opening through the ferrule, a cap threaded over the inner end of the ferrule and a key carried in the cap for engagement in the opening in said sealing plug to manipulate the same.

2. A water-tap for application to a water-main under pressure, comprising an axially straight ferrule exteriorly threaded at its outer end for engagement in the main and having an inwardly directed valve seat and an exterior shoulder beyond the inner end of the threaded portion, a tap body removably fitting over the ferrule and abutting against said shoulder, said ferrule having a lateral opening inwardly of the seat communicating with the tap body, a cap on the inner end of the ferrule for holding said body against said shoulder, a packing box mounted on the inner end of the cap, a key carried by the cap and extending through said packing box for projection into the ferrule when the cap is applied thereto, a sealing plug mounted in threaded relation within the inner end of the ferrule and detachably engaging said key for turning the plug down against the said seat to seal the ferrule during application thereof to the main.

3. A water-tap for application to mains under pressure, comprising a ferrule threaded at its outer end for engagement in the main and having a raised valve seat beyond the inner end of the threaded portion facing toward the inner end of the ferrule, a sealing plug mounted in threaded relation within the inner end of the ferrule, a removable key connected to the sealing plug for turning the same down against said seat and for operating the plug as a valve after the ferrule has been placed on the main, a tap body engaging over the ferrule and said ferrule having an opening communicating with the tap body beyond said seat, a cap on the inner end of the ferrule engaging the body to hold it on the ferrule and having a packing box engaging about said key, said packing box having openings in its wall communicating with the interior of the cap, said key having a flange thereon adapted to engage the plug, a sealing ring mounted on said flange for closing said openings to the packing box when the key and plug are turned backwardly against the packing box to seal the latter from water.

In testimony whereof I affix my signature.
ROBERT McANDREW.